United States Patent
Kutsukake et al.

(10) Patent No.: US 7,905,216 B2
(45) Date of Patent: Mar. 15, 2011

(54) COMMON RAIL AND METHOD OF MANUFACTURING COMMON RAIL

(75) Inventors: Yozo Kutsukake, Saitama (JP); Ryomei Yawata, Saitama (JP); Kenichi Kubo, Saitama (JP); Shogo Yarita, Saitama (JP); Kiyoshi Tateda, Saitama (JP)

(73) Assignee: Bosch Corporation, Tokyo (JP)

( * ) Notice: Subject to any disclaimer, the term of this patent is extended or adjusted under 35 U.S.C. 154(b) by 136 days.

(21) Appl. No.: 12/444,067

(22) PCT Filed: Feb. 23, 2007

(86) PCT No.: PCT/JP2007/053355
§ 371 (c)(1),
(2), (4) Date: Apr. 2, 2009

(87) PCT Pub. No.: WO2008/041374
PCT Pub. Date: Apr. 10, 2008

(65) Prior Publication Data
US 2010/0108036 A1    May 6, 2010

(30) Foreign Application Priority Data
Oct. 2, 2006    (JP) .................................. 2006-270448

(51) Int. Cl.
*F02M 69/46* (2006.01)
*F02M 55/02* (2006.01)
*B24C 3/32* (2006.01)

(52) U.S. Cl. ......................... 123/456; 123/468; 451/76

(58) Field of Classification Search .................. 123/456, 123/468, 469, 470; 451/36, 76
See application file for complete search history.

(56) References Cited

U.S. PATENT DOCUMENTS

| | | | |
|---|---|---|---|
| 6,497,219 B2 | 12/2002 | Natsume | |
| 6,503,126 B1 * | 1/2003 | Rhoades | 451/36 |
| 6,739,956 B2 * | 5/2004 | Noestheden | 451/76 |
| 6,935,927 B2 * | 8/2005 | Ashizawa | 451/36 |
| 7,044,842 B2 * | 5/2006 | Rhoades | 451/76 |
| 7,182,675 B2 * | 2/2007 | Rhoades | 451/76 |
| 7,637,800 B2 * | 12/2009 | Hamann et al. | 451/36 |
| 2004/0168494 A1 | 9/2004 | Taudt | |
| 2005/0127205 A1 | 6/2005 | Fath et al. | |

FOREIGN PATENT DOCUMENTS

| | | |
|---|---|---|
| JP | 5577470 A | 6/1980 |
| JP | 5616029 B2 | 4/1981 |

(Continued)

*Primary Examiner* — Thomas N Moulis
(74) *Attorney, Agent, or Firm* — Ronald E. Greigg

(57) ABSTRACT

To provide a common rail that can prevent stress concentration from arising locally with respect to intersecting portions between a flow path and branching paths and can prevent damage such as cracks.

A common rail that is used in a fuel injection system of an internal combustion engine comprises: a rail body portion that includes inside of itself a flow path along an axial direction; and branching pipe portions that are arrayed along the axial direction of the rail body portion, project from and are molded integrally with the rail body portion, and each of which includes inside of itself a branching path that branches from the flow path, wherein edges of inlets of the branching paths at intersecting portions between the flow path and the branching paths are chamfered, and, of the edges, the radius of curvature of the edges in the axial direction of the rail body portion is larger than the radius of curvature of the edges in a direction orthogonal to the axial direction of the rail body portion.

4 Claims, 14 Drawing Sheets

FOREIGN PATENT DOCUMENTS

| | | |
|---|---|---|
| JP | 6214981 A | 1/1987 |
| JP | 10213045 A | 8/1998 |
| JP | 2001200773 A | 7/2001 |
| JP | 2001295723 A | 10/2001 |
| JP | 200356428 A | 2/2003 |
| JP | 2005500916 A | 1/2005 |

* cited by examiner

COMMON RAIL AND METHOD OF MANUFACTURING COMMON RAIL

TECHNICAL FIELD

The present invention relates to a common rail that is used in a fuel injection system of an internal combustion engine and to a method of manufacturing the common rail. The present invention particularly relates to a common rail that is disposed with branching pipe portions that project from and are molded integrally with a rail body portion and to a method of manufacturing the common rail.

BACKGROUND ART

Conventionally, there has been known an accumulator fuel injection device where fuel that is pressure-fed from a high pressure pump is accumulated in a common rail that serves as a pressure accumulator and where fuel of an even pressure is distributed from this common rail with respect to plural fuel injection valves. FIG. 14 shows an example of this common rail, which is disposed with a rail body portion 312 and plural branching pipe portions 314 (in the example of FIG. 14, five) that are arrayed along an axial direction (X direction) of the rail body portion 312, are formed integrally with the rail body portion 312 and are disposed so as to project outward in a circumferential direction of the rail body portion 312. A flow path 318 is formed inside the rail body portion 312 along the axial direction, and branching paths 316 that branch from the flow path 318 are formed inside the branching pipe portions 314. Further, fuel pipes (not shown) are connected to the branching pipe portions 314, other end sides of the fuel pipes (not shown) that are connected to injection-use branching pipes 314a to 314d of the branching pipe portions 314 are connected to fuel injection valves (not shown), and the other end side of the fuel pipe (not shown) that is connected to an inflow-use branching pipe 314e is connected to a fuel supply-use pump (not shown).

In this common rail, internal pressure resulting from the high pressure fuel acts with respect to the inner surfaces of the flow path and the branching paths. Additionally, it is easy for stress to concentrate at intersecting portions where the branching paths branch from the flow path, and stress that is larger than at other portions acts thereon, so the risk that damage such as cracks will arise becomes higher when the common rail is part of a system that injects fuel of a higher pressure.

Thus, there has been proposed a common rail housing that can reduce the stress value of its stress concentration portions and significantly improve its pressure resistance. More specifically, as shown in FIG. 15, there has been disclosed a common rail housing that is configured such that the cross-sectional shape of pressure accumulating chambers 302 that pressure-accumulate high pressure fuel that has been supplied from the fuel supply-use pump is given an elliptical shape, whereby the pressure accumulating chambers 302 and second fuel passage holes 306 are disposed so as to intersect in an orthogonal direction at positions where the radius of curvature is larger than in the case of perfectly circular pipes that include pressure accumulating chambers whose cross-sectional shape is perfectly circular, whereby the stress value of intersecting portions (stress concentration portions) 309 can be reduced (e.g., see Patent Document 1).

[Patent Document 1] JP-A-2001-295723 (claims, FIG. 1)

DISCLOSURE OF THE INVENTION

Problem that the Invention is to Solve

However, in the common rail housing disclosed in Patent Document 1, of the stress that acts on the intersecting portions between the pressure accumulating chambers and the second fuel passage holes, sometimes a difference arises between the stress value in the axial direction of the housing and the stress value in the direction orthogonal to the axial direction, and sometimes stress concentration cannot be sufficiently reduced. That is, as shown in FIG. 16, in the vicinities of intersecting portions 417 between a flow path 418 and branching paths 416, the thickness of a rail body portion 412 in the direction (Y direction) orthogonal to the axial direction is thin with respect to the thickness of the rail body portion 412 in the axial direction (X direction), so deformation occurs more easily in the Y direction than in the X direction. As a result, stress in the Y direction, which acts on edges in the X direction of inlet portions of the branching paths 416, becomes larger than stress in the X direction, which acts on edges in the Y direction. Consequently, there has been the potential for cracks to arise in the edges in the X direction of the inlet portions of the intersecting portions 417 such that the durability of the common rail drops.

In order to alleviate stress concentration at the edges of the intersecting portions between the flow path and the branching paths, chamfering the edges to increase the radii of curvature is effective, but there are the problems that, in order to chamfer the radii of curvature of all of the edges in the X direction and the Y direction largely, it takes a long manufacturing time and manufacturing costs increase. For that reason, in order to efficiently alleviate stress concentration without taking manufacturing time and while controlling manufacturing costs, it is desirable to work the common rail such that the radius of curvature of the edges in the X direction, where cracks and the like easily arise, becomes larger than the radius of curvature of the edges in the Y direction and to form the necessary minimum radii of curvature for both the edges in both the X direction and the Y direction.

Ordinarily, in the manufacturing stage of a common rail, an internal polishing treatment resulting from fluid polishing or the like is performed with the purpose of deburring the inside and polishing the inner surfaces; thus, the edges of the intersecting portions between the flow path and the branching paths are chamfered. However, in a polishing treatment resulting from conventional fluid polishing, there is also the relationship of the angle formed by the inner surface of the flow path and the inner surfaces of the branching paths, and as shown in FIG. 17(a) to (c), of the edges of the inlets of the branching paths 316, edges E2 in the direction (Y direction) orthogonal to the axial direction are more easily polished than edges E1 in the axial direction (X direction) of the rail body portion 312, and the radius of curvature of the edges E1 in the X direction is worked smaller than the radius of curvature of the edges E2 in the Y direction (see FIGS. 17(b) and (c)). Consequently, there has been the problem that it is difficult to alleviate stress concentration that acts on the edges E1 in the X direction of the inlet portions of the branching paths 316.

Thus, the inventors of the present invention have made every effort to discover that the aforementioned problem can be solved by configuring the radii of curvature of the edges of the inlets of the branching paths at the intersecting portions between the flow path and the branching paths of the branching pipe portions of the rail body portion in the common rail so as to satisfy a predetermined relationship and have completed the present invention.

That is, it is an object of the present invention to provide a common rail that can prevent stress concentration from arising locally with respect to intersecting portions between a flow path and branching paths and reduce the occurrence of damage such as cracks and a method of manufacturing the common rail.

Means for Solving the Problem

According to the present invention, there is provided a common rail that is used in a fuel injection system of an internal combustion engine, the common rail comprising: a rail body portion that includes inside of itself a flow path along an axial direction; and branching pipe portions that are arrayed along the axial direction of the rail body portion, project from and are molded integrally with the rail body portion, and each of which includes inside of itself a branching path that branches from the flow path, wherein edges of inlets of the branching paths at intersecting portions between the flow path and the branching paths are chamfered, and, of the edges, the radius of curvature of the edges in the axial direction of the rail body portion is larger than the radius of curvature of the edges in a direction orthogonal to the axial direction of the rail body portion, whereby the aforementioned problem can be solved.

Further, in configuring the common rail of the present invention, it is preferred that the edges of the inlets of the branching paths are chamfered by performing, from both end portion sides of the flow path, a blast treatment that is performed by causing a polishing material to pass through the inside of the flow path while causing the polishing material to swirl inside the flow path.

Further, in configuring the common rail of the present invention, it is preferred that the diameter of the flow path is a value within the range of 8 to 12 mm.

Further, another aspect of the present invention is a method of manufacturing a common rail that is used in a fuel injection system of an internal combustion engine and comprises a rail body portion that includes inside of itself a flow path along an axial direction and branching pipe portions that are arrayed along the axial direction of the rail body portion, project from and are molded integrally with the rail body portion, and each of which includes inside of itself a branching path that branches from the flow path, the method including the step of: chamfering edges of inlets of the branching paths at intersecting portions between the flow path and the branching paths by performing, from both end portion sides of the flow path, a blast treatment that is performed by causing a polishing material to pass through the inside of the flow path while causing the polishing material to swirl inside the flow path.

EFFECTS OF THE INVENTION

According to the common rail of the present invention, the radius of curvature of the edges in the axial direction, where stress concentration easily occurs, can be made larger at the intersecting portions between the flow path and the branching paths. Consequently, of the edges of the inlets of the branching paths, the radius of curvature of the edges in the axial direction becomes larger than the radius of curvature of the edges in the direction orthogonal to the axial direction, and the necessary minimum radius of curvature can be formed for both the edges in the axial direction and the edges in the direction orthogonal to the axial direction. As a result, stress concentration in predetermined places of the intersecting portions can be reduced, damage such as cracks is controlled, and the durability of the common rail can be improved.

Further, in the common rail of the present invention, the radii of curvature of the edges of the inlets of the branching paths can be configured to easily satisfy a predetermined relationship by chamfering the edges of the inlets of the branching paths by performing a predetermined blast treatment.

Further, in the common rail of the present invention, a polishing treatment of the inside of the flow path can be made easy to perform while preventing an increase in the size of the common rail by setting the diameter of the flow path of the rail body inside a predetermined range, so the common rail can be easily worked such that the edges of the intersecting portions between the flow path and the branching paths have predetermined radii of curvature.

Further, according to the common rail manufacturing method of the present invention, the common rail can be easily worked such that the radii of curvature of the edges satisfy a predetermined relationship by using a predetermined blast treatment method to perform polishing of the inside of the flow path and chamfer the edges of the inlets of the branching paths. Consequently, there can be efficiently manufactured a common rail that has excellent durability and in which it is difficult for damage such as cracks resulting from stress concentration resulting from internal pressure to arise.

BEST MODE FOR IMPLEMENTING THE INVENTION

Figure 1:
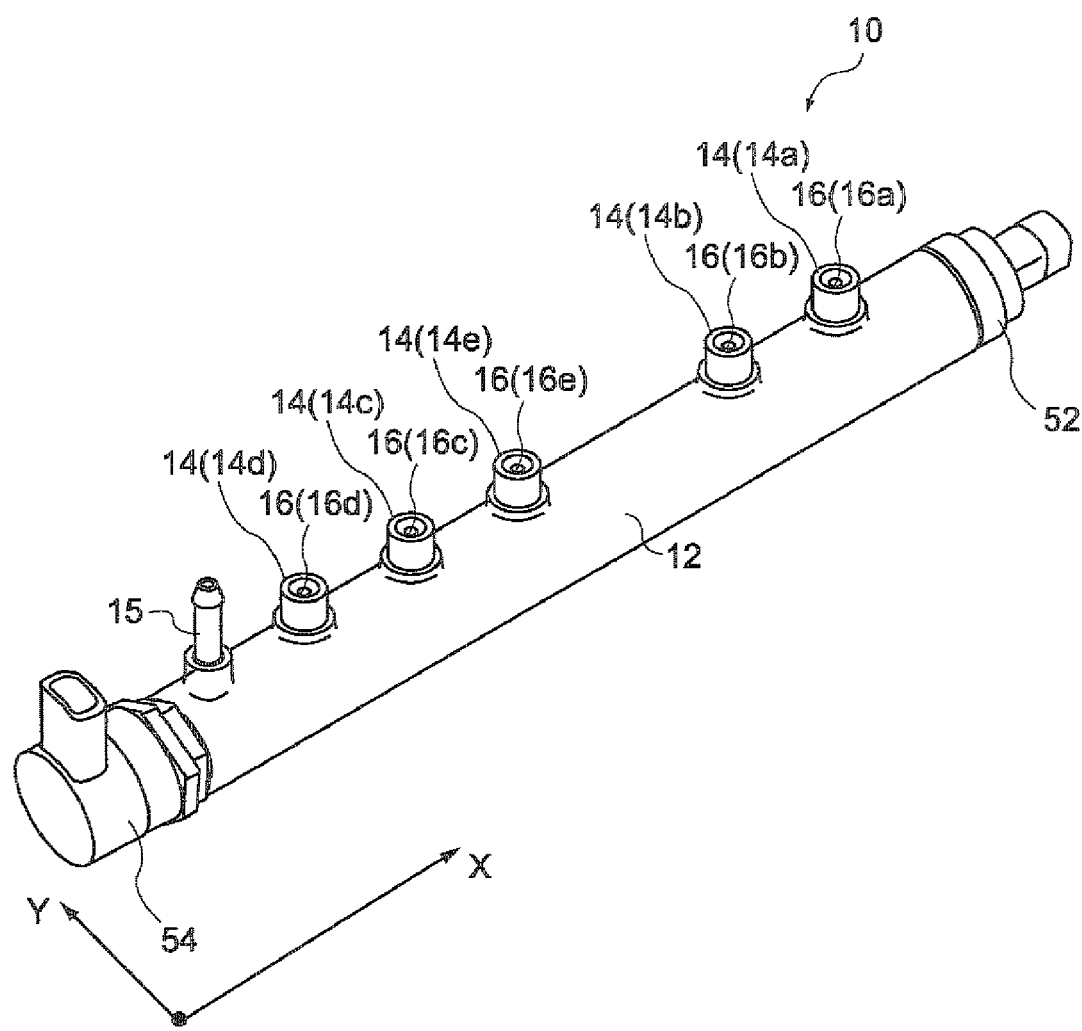
[FIG. 1] A perspective diagram of a common rail pertaining to an embodiment of the present invention.

Below, a common rail of the present embodiment and a method of manufacturing the common rail will be specifically described with appropriate reference to the drawings. However, this embodiment represents one aspect of the present invention, is not intended to limit this invention, and is capable of being arbitrarily altered within the scope of the present invention.

It will be noted that, throughout the drawings, members to which the same reference numerals have been given represent identical members, and description thereof will be appropriately omitted.

A common rail of the embodiment pertaining to the present invention comprises: a rail body portion that includes inside of itself a flow path along an axial direction; and branching pipe portions that are arrayed along the axial direction of the rail body portion, project from and are molded integrally with the rail body portion, and each of which includes inside of itself a branching path that branches from the flow path, wherein edges of inlets of the branching paths at intersecting portions between the flow path and the branching paths are chamfered, and, of the edges, the radius of curvature of the edges in the axial direction of the rail body portion is larger than the radius of curvature of the edges in a direction orthogonal to the axial direction of the rail body portion.

1. Overall Configuration

Figure 2A:
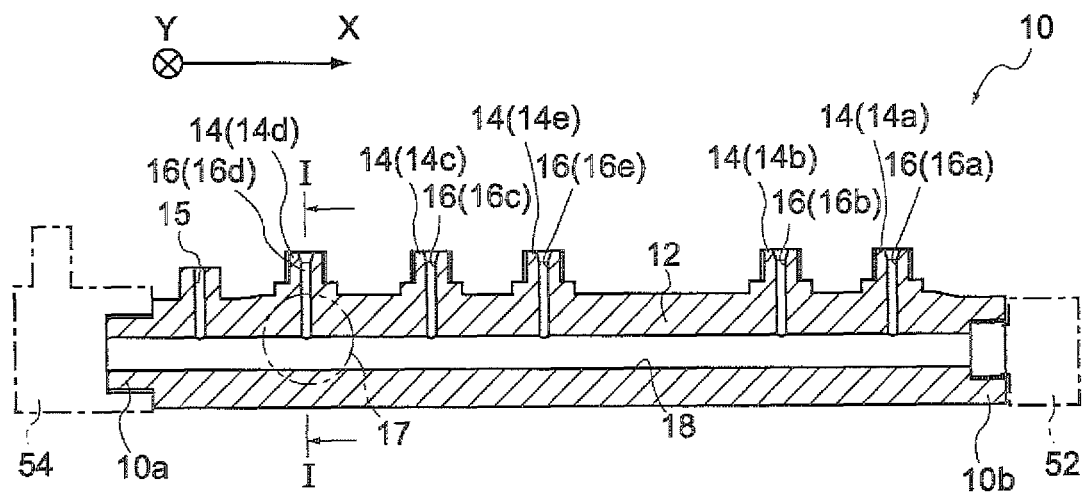
[FIG. 2] A cross-sectional diagram of the common rail pertaining to the embodiment of the present invention.
Figure 2B:
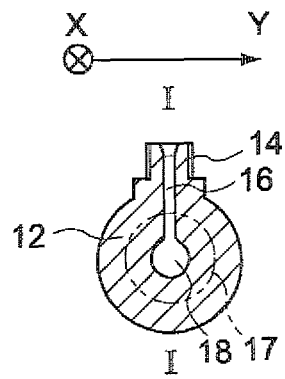

FIG. 1 and FIGS. 2(a) and (b) show a common rail 10 of the present embodiment. FIG. 1 is a perspective diagram of the common rail 10, FIG. 2(a) is a cross-sectional diagram where the common rail 10 is cut along an axial direction, and FIG. 2(b) is a cross-sectional diagram where a place where a branching path branches from a flow path is cut in a direction orthogonal to the axial direction of the common rail 10.

The common rail 10 of the present embodiment shown in FIG. 1 and FIGS. 2(a) and (b) is configured using a conventionally used steel material such as alloy steel or cast iron and is disposed with a rail body portion 12 and plural branching pipe portions 14 (in the drawings, five) that are arrayed along the axial direction (X direction) of this rail body portion 12 and project from and are formed integrally with the rail body portion 12. Of these, the rail body portion 12 includes inside of itself a flow path 18 that opens at both end portions 10a and 10b along the axial direction. Further, four injection-use branching pipes 14a to 14d of the plural branching pipe portions 14 include inside of themselves injection-use branching paths 16a to 16d that branch from the flow path 18 and whose other end sides are open, and an inflow-use branching pipe 14e of the plural branching pipe portions 14 similarly includes inside of itself an inflow-use branching path 16e that branches from the flow path 18 and whose other end side is open.

Further, threaded grooves are formed on the outer peripheral surfaces of each of the branching pipe portions 14 and the end portion 10a on the one side in the axial direction of the rail body portion 12. Additionally, an electromagnetic controller 54 that controls the amount of fuel that is discharged from a discharge path 15 and controls the pressure inside the rail is connected to the end portion 10a of the rail body portion 12. Further, fuel pipes (not shown) that lead to fuel injection valves (not shown) that inject fuel into cylinders of an internal combustion engine (not shown) are connected to each of the injection-use branching pipes 14a to 14d, and a fuel pipe (not shown) that leads to a discharge valve (not shown) of a fuel supply pump (not shown) is connected to the inflow-use branching pipe 14e (see FIG. 3). A threaded groove is formed in the inner peripheral surface of the other end portion 10b of the rail body portion 12, and a pressure sensor 52 for detecting the pressure inside the rail is connected to the other end portion 10b of (see FIG. 3).

Figure 3:
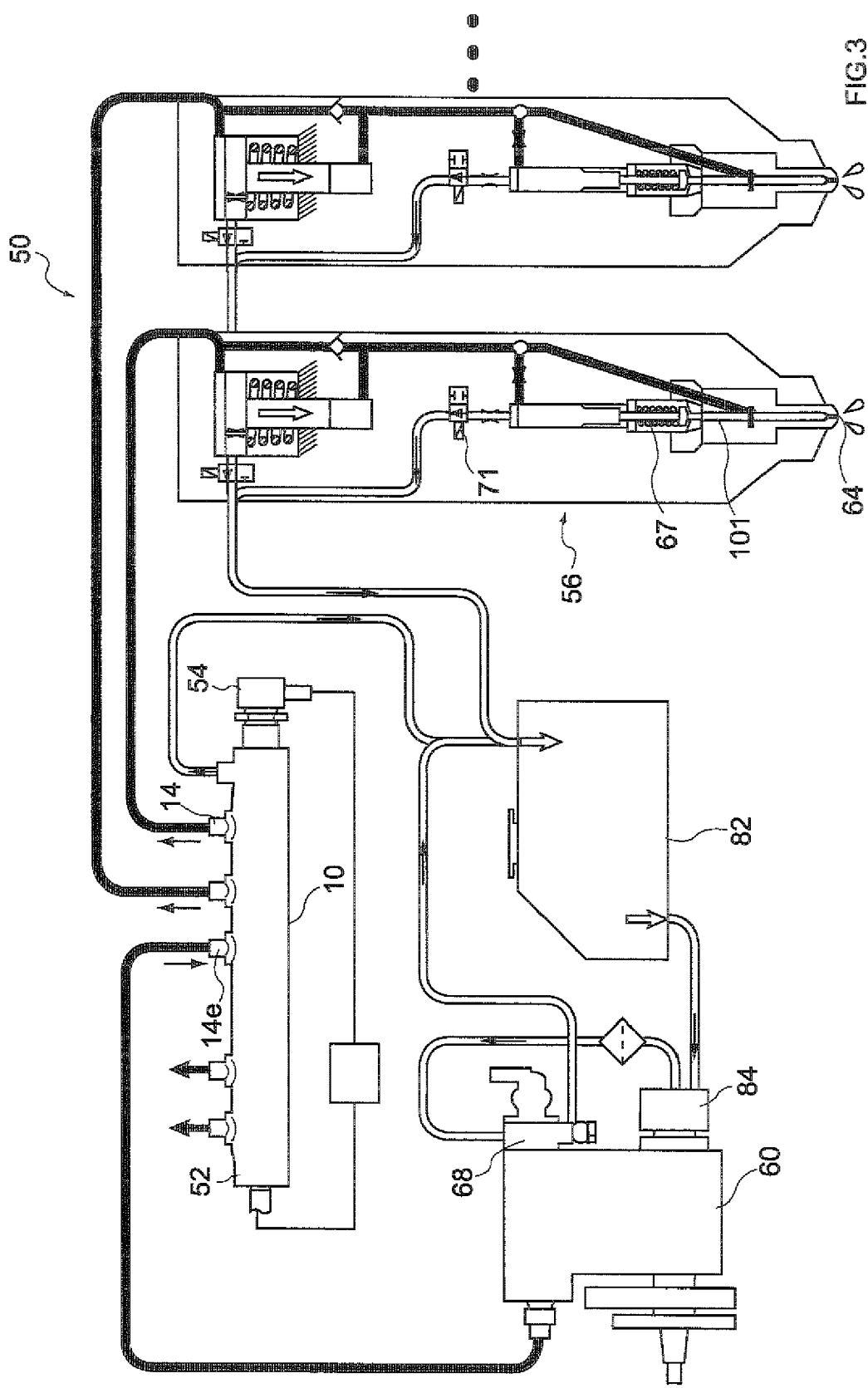
[FIG. 3] A diagram showing an example of an accumulator fuel injection device that is disposed with the common rail.

FIG. 3 shows a configural example of an accumulator fuel injection device 50 that uses this common rail 10. In the example of this accumulator fuel injection device 50, fuel inside a fuel tank 82 is sucked up by a feed pump 84 of a fuel supply pump 60, passes through an amount regulating valve 68 that performs injection amount regulation, is thereafter supplied to a pressurizing chamber (not shown), is pressurized to a high pressure inside the pressurizing chamber (not shown), and is pressure-fed to the common rail 10. Further, the high pressure fuel that has been pressure-fed to the common rail 10 flows into the inside of the common rail 10 via the inflow-use branching path (not shown) inside the inflow-use branching pipe 14e. Then, the high pressure fuel is accumulated inside the common rail 10 and is supplied at an even pressure via the injection-use branching paths (not shown) inside the injection-use branching pipes 14a and 14b with respect to fuel injection valves 56. The pressure inside this common rail 10 is detected by the pressure sensor 52 connected to the common rail 10 and is controlled by the electromagnetic controller 54 by discharging a good amount of the fuel.

Further, nozzle needles 101 of the fuel injection valves 56 are energized in a direction where they close injection holes 64 by the high pressure fuel that is supplied to pressure control chambers 67 inside the fuel injection valves 56, and the force with which the nozzle needles 101 are energized is weakened as a result some of the high pressure fuel inside the pressure control chambers 67 being released by the control of valves 71; as a result, the fuel is injected from the injection holes 64 into the insides of the cylinders of the internal combustion engine. Thus, the high pressure fuel can be supplied with respect to each of the fuel injection valves 56 without the injection pressure being affected by fluctuations in the rotational speed of the engine, and the fuel can be injected to the internal combustion engine at a desired timing. Consequently, noise can be reduced and the contained amount of environmental pollutants can be reduced.

2. Radii of Curvature Configuration

Figure 4A:
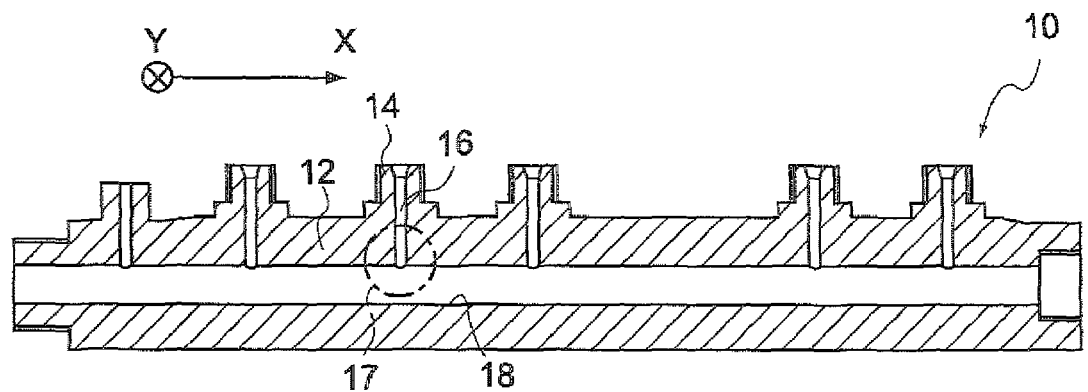
[FIG. 4] A diagram for describing the shapes of edges of inlets of branching paths.
Figure 4B:
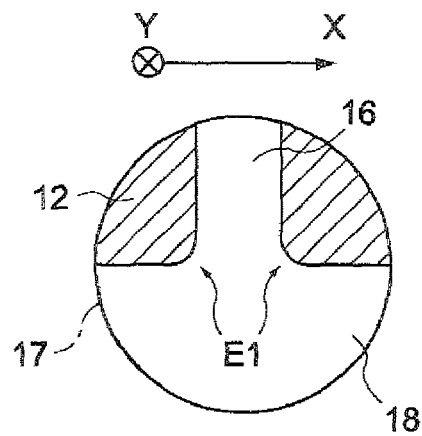
Figure 4C:
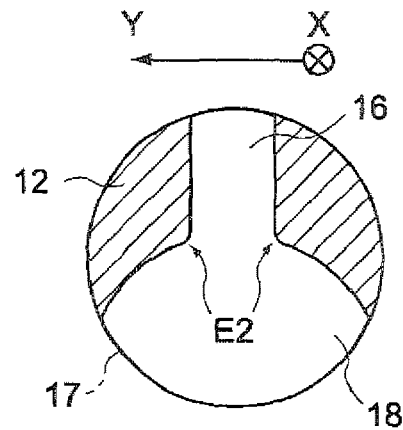

In the common rail 10 of the present embodiment, as shown in FIGS. 4(a) and (b), edges of inlets of the branching paths 16 are chamfered at intersecting portions 17 between the flow path 18 of the rail body portion 12 and the branching paths 16 of the branching pipe portions 14, and, of these edges, the radius of curvature of edges E1 (see FIG. 4(b)) in the axial direction (X direction) of the rail body portion 12 is larger than the radius of curvature of edges E2 (see FIG. 4(c)) in the direction (Y direction) orthogonal to the axial direction of the rail body portion 12.

That is, when a polishing treatment of the inside is administered in a conventional common rail manufacturing process, of the edges of the inlets of the branching paths, it is easy for the radius of curvature of the edges in the axial direction of the rail body portion to become smaller than the radius of curvature of the edges in the direction orthogonal to the axial direction of the rail body portion because of the relationship of the angles formed by the inner surfaces of the branching paths of the common rail and the inner surface of the flow path. When this happens, of the thickness around the inlets of the branching paths of the rail body portion, the thickness in the axial direction of the rail body portion becomes thicker than the thickness in the direction orthogonal to the axial direction, it is easy for the rail body portion to deform in the direction orthogonal to the axial direction, and, coupled with this, it becomes easy for stress resulting from tension to concentrate at the edges on the axial direction side of the rail body when internal pressure is generated inside the common rail.

Thus, the common rail 10 of the present invention is configured such that, of the edges of the inlets of the branching paths 16, the radius of curvature of the edges E1 in the X direction is made larger than the radius of curvature of the edges E2 in the Y direction, whereby tensile stress that acts in the Y direction on the edges in the X direction is reduced. Thus, a balance between tensile stress that acts in the X direction and tensile stress that acts in the Y direction about the intersecting portions is achieved, and a situation where damage such as cracks occurs as a result of stress concentrating locally with respect to the edges in the X direction of the inlets of the branching paths 16 can be prevented without having to use a high strength material and without being accompanied by an increase in production costs.

Figure 5:
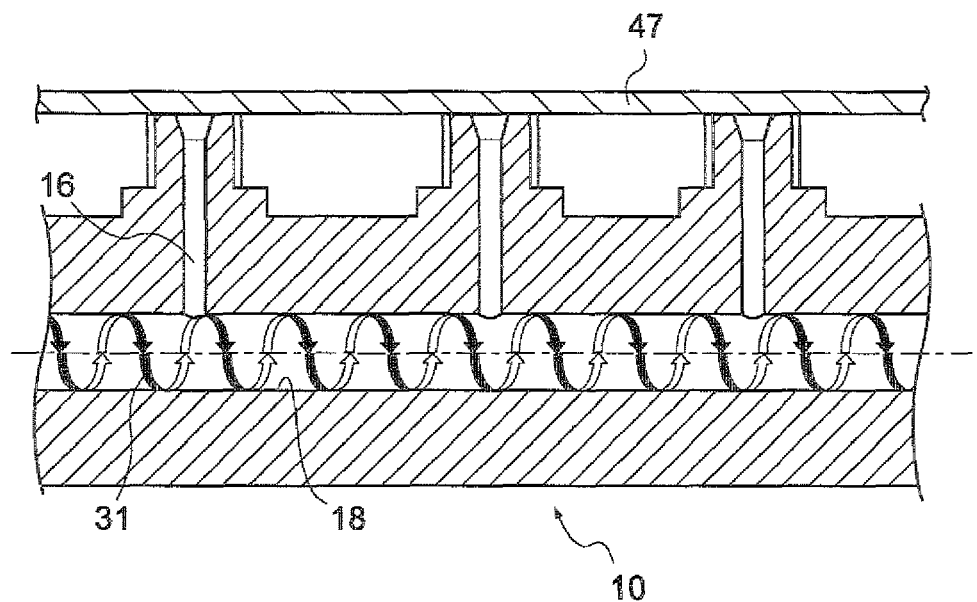
[FIG. 5] A diagram for describing a blast treatment accompanied by a spiral flow.

A radii of curvature configuration that satisfies this relationship can, for example, as shown in FIG. 5, be formed by performing, from both end portion sides of the flow path 18, a blast treatment that is performed by causing a polishing material 31 to pass through the inside of the flow path 18 while causing the polishing material 31 to swirl inside the flow path 18.

That is, by performing the blast treatment in this manner, the polishing material proceeds in the axial direction while swirling, and the polishing material can be efficiently caused to collide with the edges in the axial direction of the edges of the inlets of the branching paths. Further, because the polishing material collides unevenly with one side of the edges in the axial direction when the blast treatment is performed only from one end portion side, the blast treatment is also performed from the other end portion side. In this manner, the edges in axial direction can be sufficiently polished more than the edges in the direction orthogonal to the axial direction, and a predetermined radii of curvature configuration can be easily formed.

Figure 6:
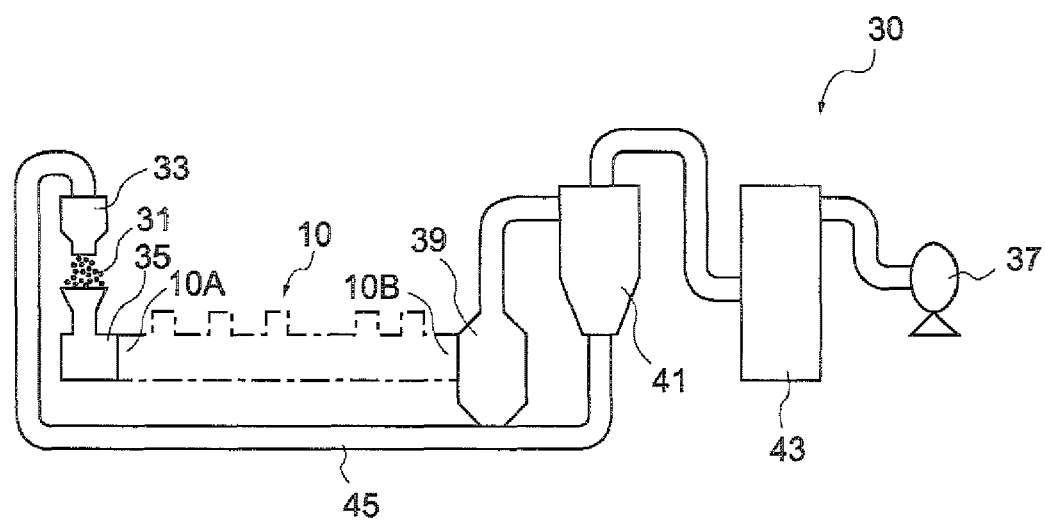
[FIG. 6] A diagram showing a configural example of a blast treatment apparatus.

FIG. 6 shows an example of the configuration of a blast treatment apparatus that is suited for this blast treatment. This blast treatment apparatus 30 is configured by a polishing material tank 33 in which the polishing material 31 is stored, a swirling flow introducing portion 35 that is attached to the end portion 10A of the common rail 10 and is for introducing the polishing material 31 supplied from the polishing material tank 33 to the inside the common rail 10 while causing the polishing material 31 to swirl, a suction blower 37 that sucks air from the end portion 10B on the other side of the common rail 10, a receiver box 39 that recovers the polishing material 31 that has been passed through the inside of the common rail 10, a cyclone separator 41 for separating dust from the polishing material 31 that has been recovered, a dust trapping portion 43 for trapping dust that has been separated by the cyclone separator 41, and a circulation path 45 that refluxes the polishing material from which dust has been separated back to the polishing material tank 33. Further, in this blast treatment apparatus 30, there is used a lid member 47 that closes the openings of the branching paths 16 of the branching pipe portions 14 of the common rail 10 when the blast treatment is to be performed.

The polishing treatment that is performed using this blast treatment apparatus 30 is performed as follows.

First, the one end 10A of the common rail 10 is connected to the swirling flow introducing portion 35, and the other end 103 is connected to the receiver box 39. Next, the suction blower 37 is actuated in a state where the lid member 47 is disposed on, so as to close, the open ends of the branching pipe portions 12 of the common rail 10, whereby the air inside the common rail 10 is sucked to generate negative pressure. In this state, the polishing material 31 inside the polishing material tank 33 is inputted to the swirling flow introducing portion 35. Then, the polishing material 31 flows into the inside of the common rail 10 while swirling as a result of passing through the swirling flow introducing portion 35, proceeds toward the other end 10B while polishing the inner surface of the flow path 18, and is discharged into the inside of the receiver box 39.

As conditions when the blast treatment is performed at this time, for example, the pressure of the air can be 0.5 to 1.0 kg/m$^2$, the polishing material input amount can be 3 to 5 kg per minute, and the treatment time can be 30 to 60 seconds. Further, as the polishing material that is used, various materials, such as iron, stainless steel, or a resin material whose hardness is high, can be used, and as for the size of the polishing material, the diameter can be within the range of 0.2 to 1.0 mm.

Thereafter, the arrangement direction of the common rail 10 is switched such that the end portion 10A, which had been connected to the swirling flow introducing portion 35 during the previous blast treatment, is connected to the receiver box 39 and such that the end portion 10B, which had been connected to the receiver box 39 during the previous blast treatment, is connected to the swirling flow introducing portion 35, and thereafter the blast treatment is performed in the same manner as the aforementioned treatment method.

By performing the blast treatment from both end sides in this manner, the inner surface of the flow path inside the common rail and the edges of the inlets of the branching paths are evenly polished, and, of the edges of the inlets of the branching paths, the necessary minimum radii of curvature can be formed for both the edges in the axial direction and the edges in the direction orthogonal to the axial direction.

Here, the difference between radii of curvature relationships of the edges of the inlets of the branching paths in the common rail where the blast treatment has been performed from both end portion sides of the flow path using the blast treatment apparatus with the configuration shown in FIG. 6 and radii of curvature relationships of the edges of the inlets of the branching paths in the common rail where an inner surface treatment has been performed by conventional fluid polishing will be described.

Figure 7A:
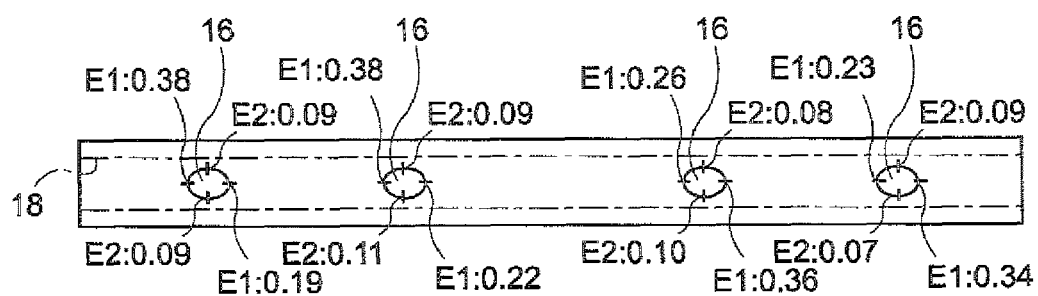
[FIG. 7] A diagram for describing radii of curvature relationships of the edges of the inlets of the branching path formed by the blast treatment of the present embodiment.
Figure 7B:
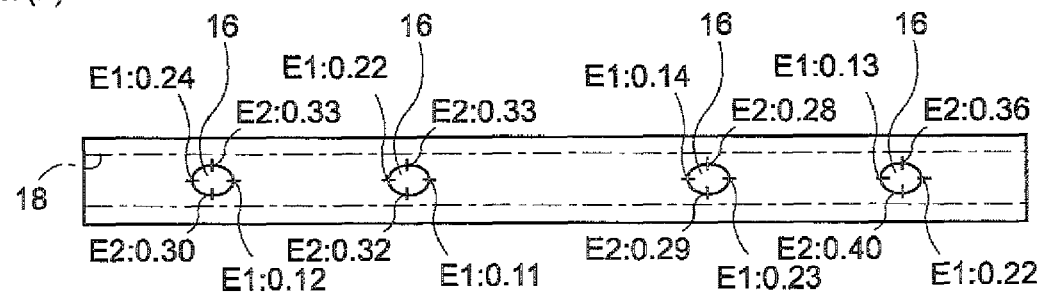

FIG. 7(a) shows the sizes of the radii of curvature of the edges of the inlets of the branching paths in a case where an inner surface treatment has been performed by the blast treatment of the present embodiment with respect to a common rail that includes a flow path 18 whose diameter is 8 mm and four branching paths 16 that branch from this flow path 18 and whose diameters are 3 mm. FIG. 7(b) shows the sizes of the radii of curvature of the edges of the inlets of the branching paths in a case where an inner surface treatment has been performed by conventional fluid polishing with respect to the same common rail. The radii of curvature shown in the respective drawings represent the sizes of the radii, and the unit thereof is mm (millimeters).

This blast treatment was performed using a polishing material made of iron with a diameter of 0.6 mm, making the pressure of the air 0.7 kg/m$^2$, making the polishing material input amount 4 kg/minute, and inputting the polishing material for 60 seconds from both end portion sides of the flow path. Further, the fluid polishing was performed by inputting a fluid at the same time from both end portion sides of the flow path by AFM and causing the fluid to flow out from the branching paths, and this was performed for 80 seconds.

As shown in FIGS. 7(a) and (b), in the conventional fluid polishing, in both of the edges of the inlets of the branching paths, whereas the radius of curvature of the edges E1 in the axial direction is smaller than the radius of curvature of the edges E2 in the direction orthogonal to the axial direction, in the blast treatment of the present embodiment, the radius of curvature of the edges E1 in the axial direction is larger than the radius of curvature of the edges E2 in the direction orthogonal to the axial direction. Consequently, stress concentration with respect to the edges in the axial direction, where it was conventionally easy for cracks and the like to arise, is alleviated, and the durability of the common rail can be improved. In this manner, it will be clearly understood that the radii of curvature relationships of the edges that are formed differ between the conventional fluid polishing and the blast treatment of the present embodiment.

It will be noted that the configuration of the blast treatment apparatus and the treatment conditions can be appropriately changed by applying a publicly known apparatus and treatment conditions. Moreover, a method other than the aforementioned blast treatment can also be appropriately employed to form a radii of curvature configuration that satisfies a predetermined relationship.

3. Thick Portions

Further, in a case where the radii of curvature configuration of the edges of the intersecting portions between the flow path and the branching paths is configured as mentioned above, as shown in FIG. 8, thick portions 20 where the thickness around the flow path is thicker than the thickness around the flow path of portions outside of those can also be disposed in the intersecting portions (not shown) between the flow path (not shown) and the branching paths 16. In other words, thin portions 21 where the thickness around the flow path is thinner than the thickness around the flow path in the vicinities of the intersecting portions can be disposed in the portions outside of the intersecting portions.

That is, by making the thickness of the portions of the rail body portion 12 outside of the intersecting portions between the flow path of the rail body portion 12 and the branching paths 16 of the branching pipe portions 14 relatively thinner in comparison to the vicinities of the intersecting portions, a state where it is easy for the rail body portion 12 to deform about the intersecting portions in the direction (Y direction) intersecting the axial direction of the rail body portion 12 can be alleviated in comparison to a case where the thickness of the rail body portion 12 is uniform overall. Consequently, stress concentration at specific places can be prevented in combination with the aforementioned radii of curvature configuration of the edges.

More specifically, as mentioned above, high pressure fuel is always accumulated inside the common rail, and internal pressure arises in the inner surface of the flow path and the inner surfaces of the branching paths. Particularly at the intersecting portions between the flow path and the branching paths, it is easy for stress to concentrate at the edges of the inlets of the branching paths. At this time, the thickness in the axial direction (X direction) of the rail body portion is relatively thicker at the intersecting portions in comparison to the thickness in the direction (Y direction) orthogonal to the axial direction, and it is easier for the rail body portion to deform in the Y direction than in the X direction. As a result, of the edges of the inlet portions of the branching paths at the intersecting portions, stress in the Y direction concentrates with respect to the edges in the X direction, which is one factor why damage such as cracks arises.

Figure 8:
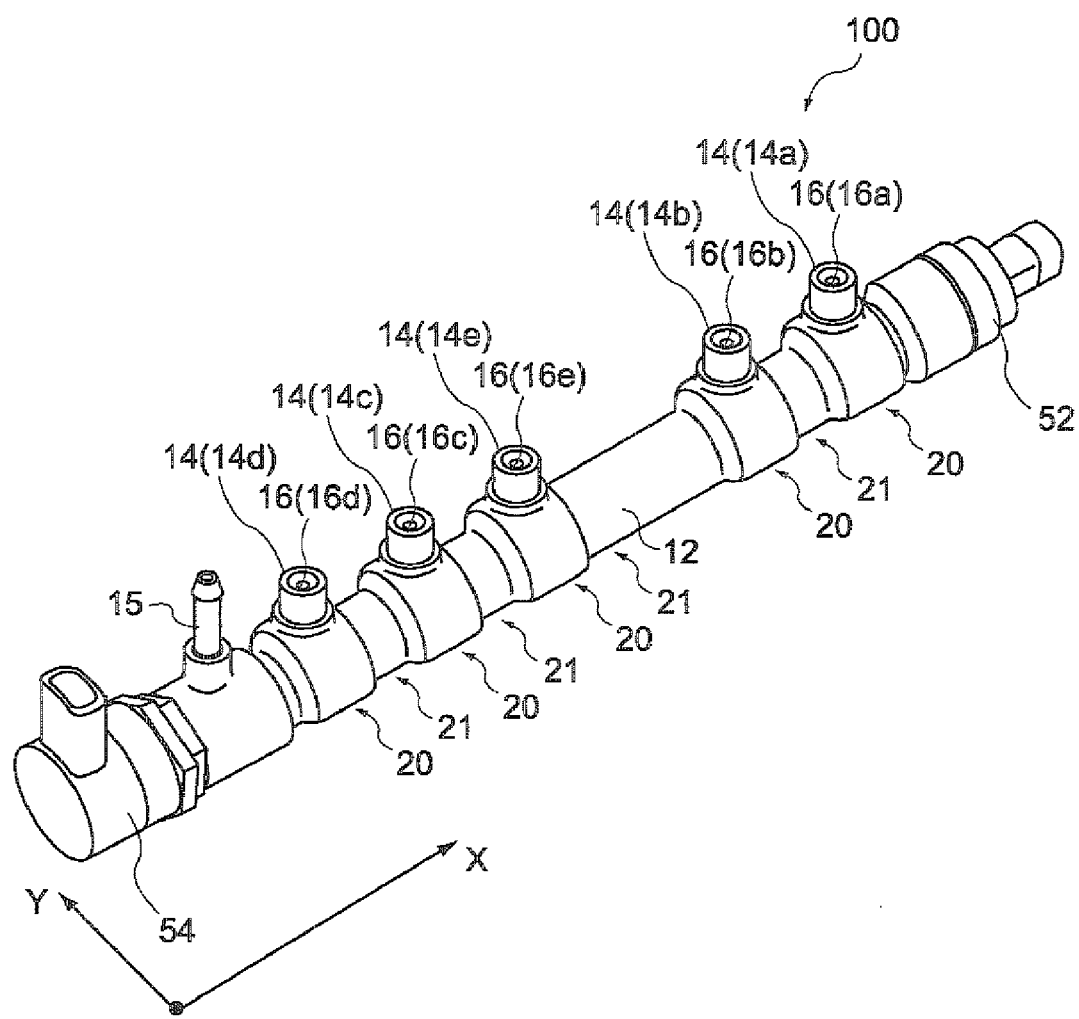
[FIG. 8] A perspective diagram of a common rail that is disposed with thick portions.

Thus, as shown in FIG. 8, by disposing the thick portions 20 in the intersecting portions between the flow path and the branching paths 16, the rail body portion is configured such that stress that acts in the Y direction about the intersecting portions is reduced and such that stress concentration at specific places is controlled.

Figure 9A:
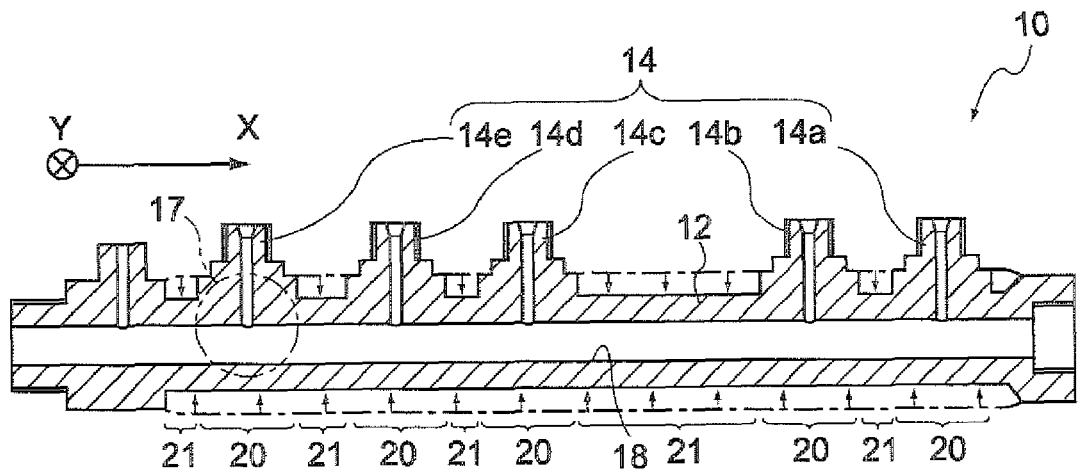
[FIG. 9] A diagram showing an example of a method of forming the thick portions.
Figure 9B:
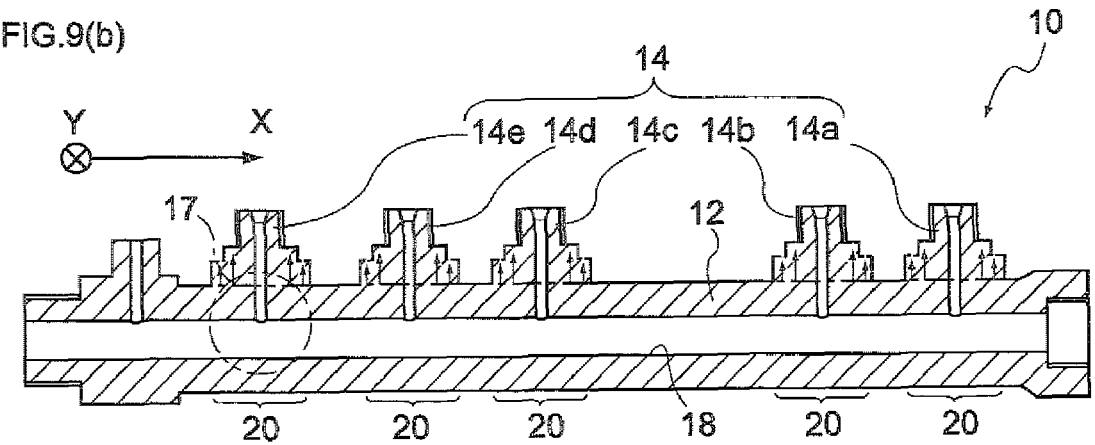

In configuring the common rail that is disposed with the thick portions 20, as shown in FIG. 9(a), the thin portions 21 may be formed by reducing the thickness of portions outside of the thick portions 20 from a conventional common rail, or, as shown in FIG. 9(b), the thick portions 20 can be formed by enhancing the thickness of the vicinities of the intersecting portions 17 with respect to a conventional common rail.

Among these, as shown in FIG. 9(a), when the thin portions 21 are configured by reducing the thickness of portions outside of the thick portions 20, the amount of raw materials can be reduced, manufacturing costs can be reduced and the common rail can be made lightweight, so this is a preferred aspect.

Figure 10:
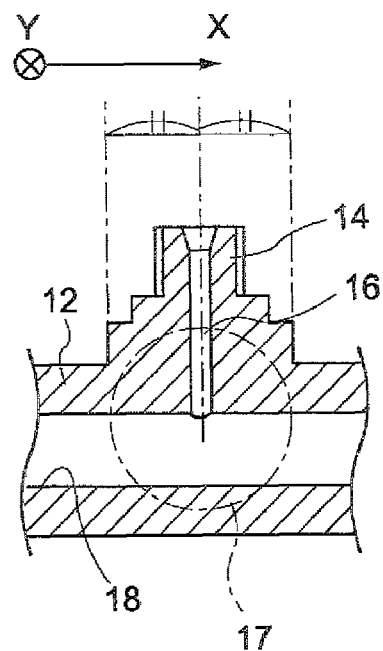
[FIG. 10] A diagram showing another example of a method of forming the thick portions.

Further, in configuring the thick portions 20, as shown in FIG. 10, it is preferred to dispose the thick portions 20 evenly on both sides along the axial direction (X direction) of the rail body portion 12 about the intersecting portions 17 between the flow path 18 and the branching paths 16.

When the thick portions 20 are configured in this manner, of tensile stress that acts on the intersecting portions 17, the stress values on both sides along the axial direction (X direction) can be made even. Consequently, damage to the common rail can be reduced without stress concentrating with respect to edges on one side in the axial direction of the edges of the inlet portions of the branching paths 16.

Figure 11:
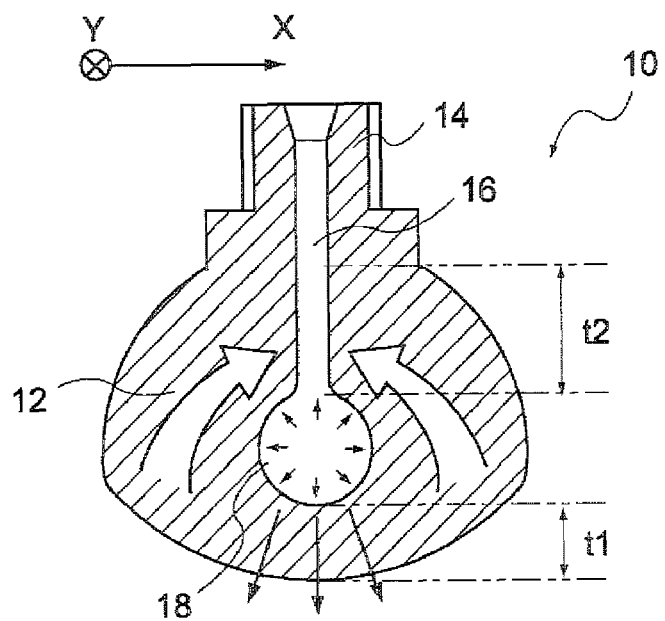
[FIG. 11] A diagram for describing an arrangement configuration of the thick portions.

Further, in configuring the thick portions 20, as shown in FIG. 11, it is preferred to make a thickness t2 on the branching direction side (upper side in the drawing) of the branching paths 16 thicker than a thickness t1 on the opposite side of the branching direction (lower side in the drawing).

When the thick portions 20 are configured in this manner, as shown in FIG. 11, the opposite side of the branching direction is actively deformed when internal pressure arises inside a common rail 100 and, as a result, compressive stress can be caused to act with respect to the intersecting portions 17 in the direction (Y direction) orthogonal to the axial direction. Consequently, stress concentration can be controlled as a result of some of the tensile stress that acts in the Y direction with respect to the intersecting portions 17 being cancelled out by internal pressure such that the tensile strength that acts in the Y direction is reduced. As a result, damage to the common rail can be reduced.

Figure 12A:
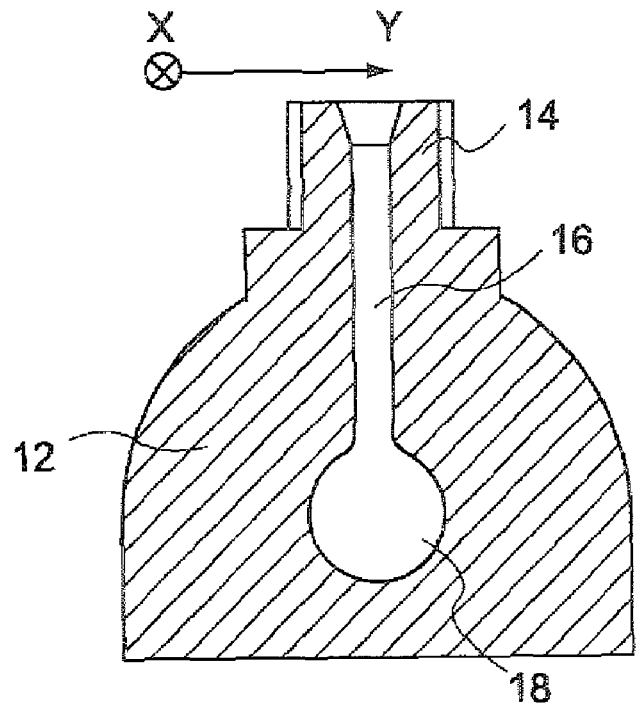
[FIG. 12] A diagram (1) showing an example where the thickness of the thick portions has been made different.
Figure 12B:
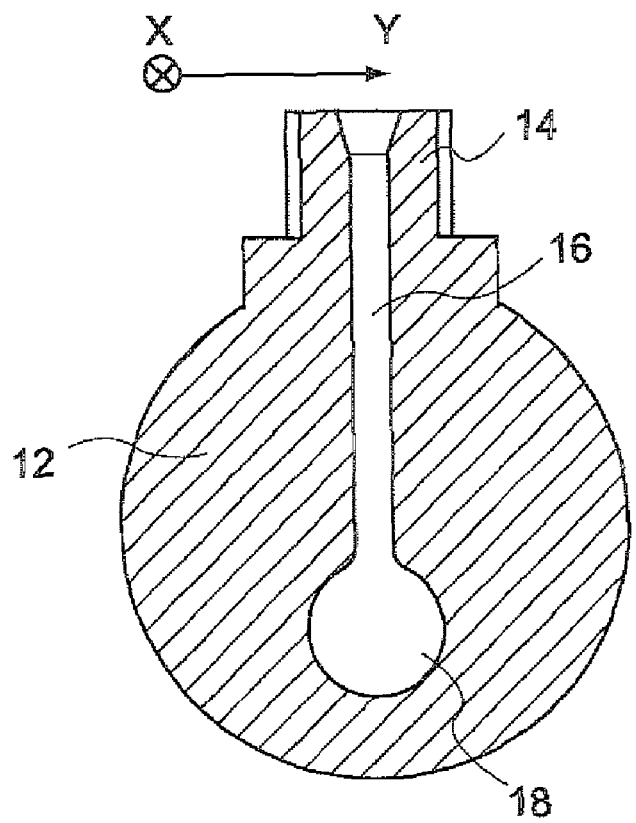

As examples of thick portions where the thickness on the branching direction side (upper side in the drawing) of the branching paths 16 is made thicker than the thickness on the opposite side (lower side in the drawing) of the branching direction, in addition to FIG. 11, the thick portions can also be configured as in FIGS. 12(a) and (b). FIG. 11 is an example where the outer peripheral surface on the opposite side of the branching direction of the branching paths 16 is made into a curved surface, FIG. 12(a) is an example where the outer peripheral surface on the opposite side of the branching direction of the branching paths 16 is made into a flat surface, and FIG. 12(b) is an example where the position of the flow path 18 inside the rail body portion 12 is disposed offset on the opposite side of the branching direction of the branching paths 16.

Among these, because compressive stress can be efficiently caused to act in the Y direction with respect to the intersecting portions 17, as shown in FIG. 11, it is preferred that the radius of curvature of the outer periphery of the rail body portion 12 on the branching direction side of the branching paths 16 in a cross section where the thick portions 20 are cut along the direction orthogonal to the axial direction is smaller than the radius of curvature of the outer periphery of the rail body portion 12 on the opposite side of the branching direction of the branching paths 16.

It will be noted that, in a state where the radius of curvature of the outer periphery of the rail body portion 12 on the branching direction side is smaller than the radius of curvature of the outer periphery of the rail body portion 12 on the opposite side of the branching direction, there is also included a configuration where, as shown in FIG. 12(a), the outer periphery of the rail body portion 12 on the opposite side of the branching direction is linear, and even with this configuration, compressive stress can be caused to act in a predetermined direction with respect to the intersecting portions 17 in comparison to a conventional configuration where the cross section is circular.

Figure 13A:
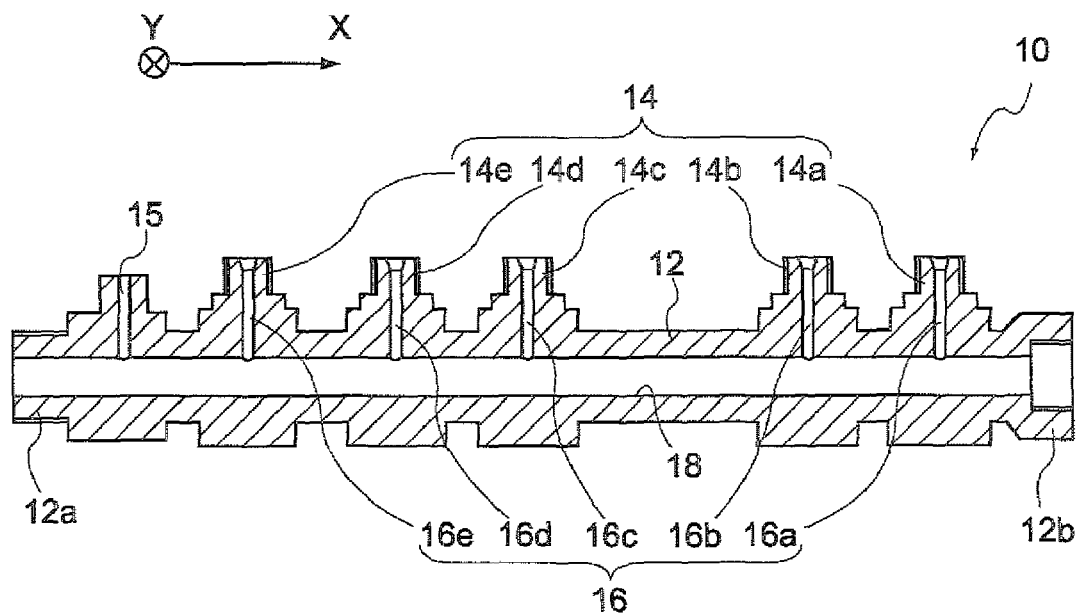
[FIG. 13] A diagram (2) showing an example where the thickness of the thick portions has been made different.
Figure 13B:
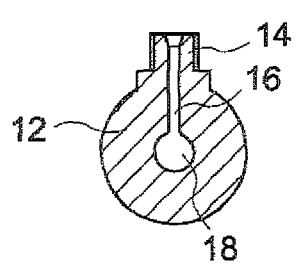
Figure 14:
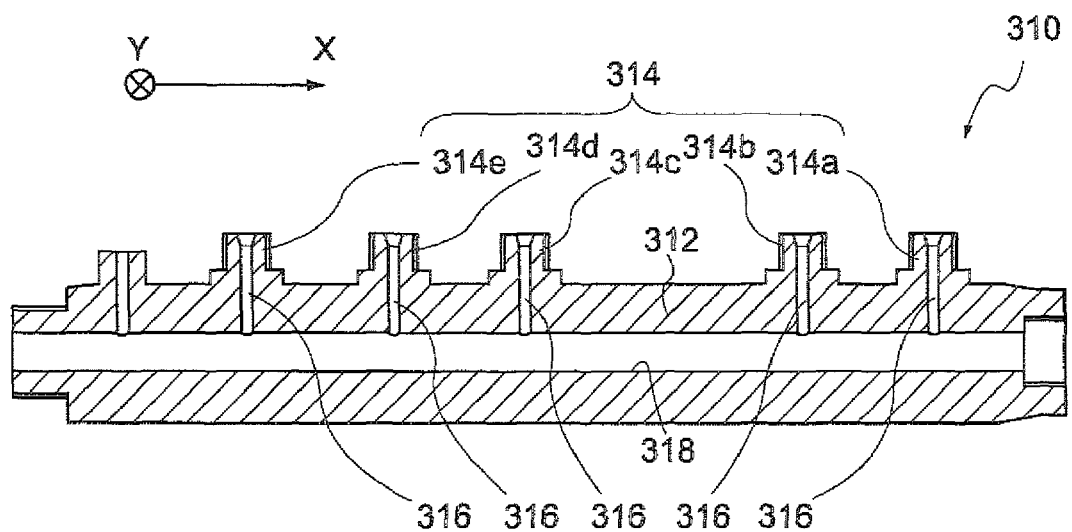
[FIG. 14] A diagram (1) for describing the configuration of a conventional common rail.
Figure 15:
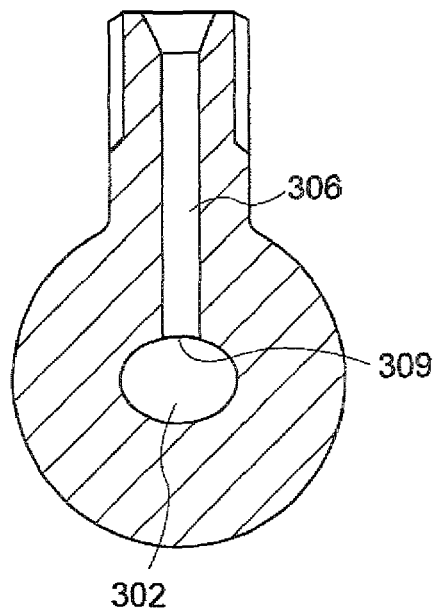
[FIG. 15] A diagram (2) for describing the configuration of a conventional common rail.
Figure 16A:
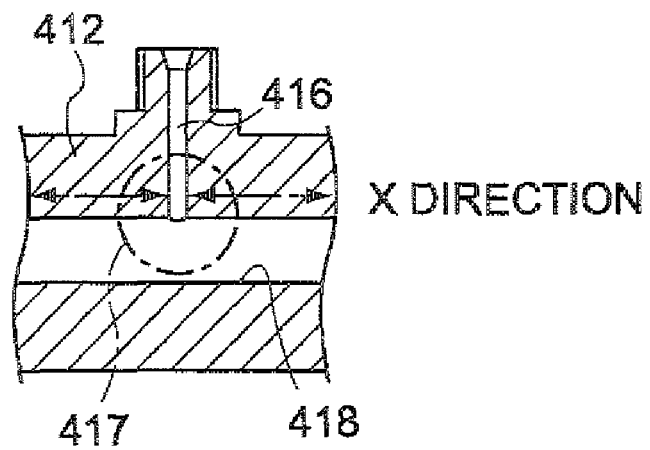
[FIG. 16] A diagram for describing the action of tensile stress in a common rail with a conventional configuration.
Figure 16B:
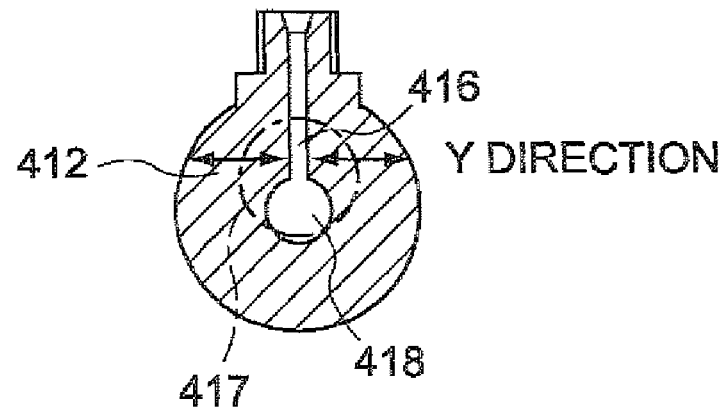
Figure 17A:
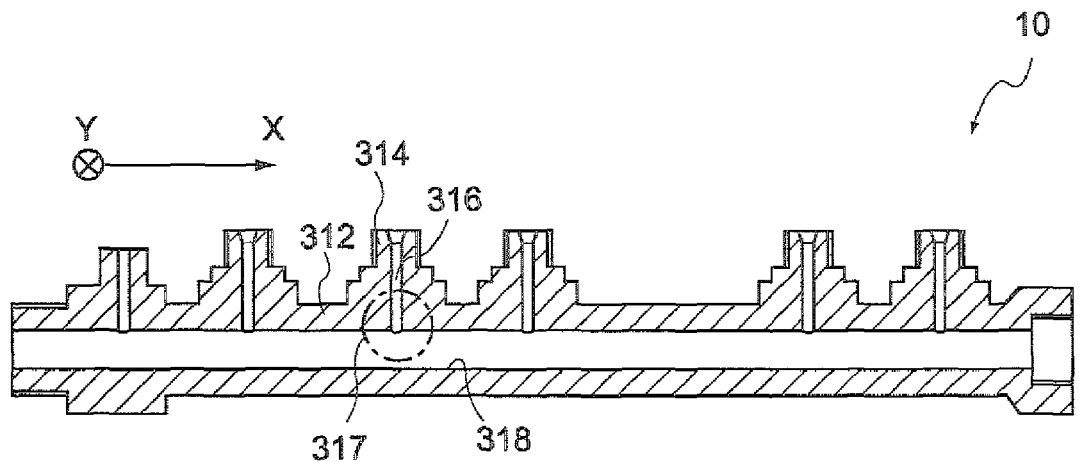
[FIG. 17] A diagram for describing the shapes of edges of inlets of branching paths in the conventional common rail.
Figure 17B:
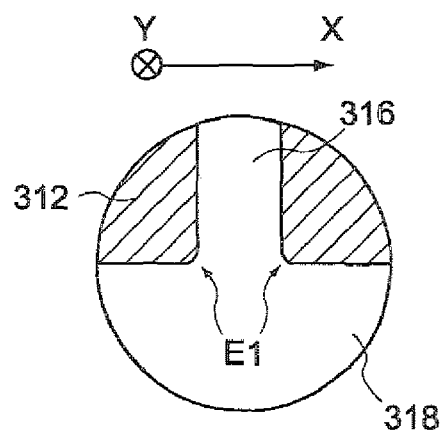
Figure 17C:
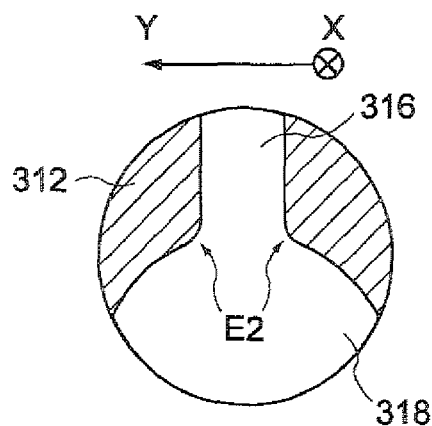

However, it is not essential to make the thickness of the thick portions 20 on the branching direction side (upper side in the drawing) of the branching paths 16 thicker than the thickness on the opposite side (lower side in the drawing) of the branching direction, and as shown in FIGS. 13(a) and (b), even when the thickness of the thick portions 20 around the flow path 18 is made even, deformation in the direction intersecting the axial direction can be reduced and damage to the common rail can be reduced in comparison to a conventional common rail.

Further, it goes without saying that, when consideration does not have to be given to a rise in production costs and production workability, the common rail may also be configured using a material of a higher strength than conventional materials and that a heat treatment may also be administered; when the common rail is configured in this manner, damage such as cracks resulting from stress that acts because of internal pressure at the intersecting portions between the flow path and the branching paths can be more effectively prevented.

The invention claimed is:

1. A common rail that is used in a fuel injection system of an internal combustion engine, the common rail comprising:
    a rail body portion that includes inside of itself a flow path along an axial direction; and
    branching pipe portions that are arrayed along the axial direction of the rail body portion, which project from and are molded integrally with the rail body portion, and each of which includes inside of itself a branching path that branches from the flow path, wherein
    edges of inlets of the branching paths at intersecting portions between the flow path and the branching paths are chamfered, and, of the edges, a radius of curvature of the edges in the axial direction of the rail body portion is larger than a radius of curvature of the edges in a direction orthogonal to the axial direction of the rail body portion.

2. The common rail according to claim 1, wherein the edges of the inlets of the branching paths are chamfered by performing, from both end portion sides of the flow path, a blast treatment that is performed by causing a polishing material to pass through an inside of the flow path while causing the polishing material to swirl inside the flow path.

3. The common rail according to claim 1, wherein a diameter of the flow path is a value within the range of 8 to 12 mm.

4. A method of manufacturing a common rail that is used in a fuel injection system of an internal combustion engine and comprises a rail body portion that includes inside of itself a flow path along an axial direction and branching pipe portions that are arrayed along the axial direction of the rail body portion, which project from and are molded integrally with the rail body portion, and each of which includes inside of itself a branching path that branches from the flow path, the method including the step of:
    chamfering edges of inlets of the branching paths at intersecting portions between the flow path and the branching paths by performing, from both end portion sides of the flow path, a blast treatment that is performed by causing a polishing material to pass through an inside of the flow path while causing the polishing material to swirl inside the flow path.

* * * * *